(12) United States Patent
Shen et al.

(10) Patent No.: US 10,853,610 B2
(45) Date of Patent: Dec. 1, 2020

(54) COMBINED TWO-DIMENSIONAL CODE, ELECTRONIC CERTIFICATE CARRIER, AND GENERATION AND READING APPARATUS AND METHOD

(71) Applicants: Beijing Bigcode Technology Co., Ltd., Beijing (CN); Beijing Sigone Investment Co., Ltd., Beijing (CN)

(72) Inventors: Wei Shen, Beijing (CN); Siping Wang, Beijing (CN)

(73) Assignees: Beijing Bigcode Technology Co., Ltd, Beijing (CN); Beijing Sigone Investment Co., Ltd, Beijing (CN)

(*) Notice: Subject to any disclaimer, the term of this patent is extended or adjusted under 35 U.S.C. 154(b) by 0 days.

(21) Appl. No.: 16/467,946

(22) PCT Filed: Dec. 8, 2017

(86) PCT No.: PCT/CN2017/115343
§ 371 (c)(1),
(2) Date: Jun. 7, 2019

(87) PCT Pub. No.: WO2018/103755
PCT Pub. Date: Jun. 14, 2018

(65) Prior Publication Data
US 2020/0074129 A1    Mar. 5, 2020

(30) Foreign Application Priority Data
Dec. 9, 2016    (CN) .......................... 2016 1 1127730

(51) Int. Cl.
*G06K 7/10*    (2006.01)
*G06K 7/14*    (2006.01)
(Continued)

(52) U.S. Cl.
CPC ..... *G06K 7/1417* (2013.01); *G06K 19/06037* (2013.01); *H04L 9/0643* (2013.01); *H04L 9/0861* (2013.01)

(58) Field of Classification Search
CPC ... G06K 7/1443; G06K 19/06037; G06K 7/14
(Continued)

(56) References Cited

U.S. PATENT DOCUMENTS

| | | | |
|---|---|---|---|
| 2005/0199724 A1* | 9/2005 | Lubow | G06K 7/1434 235/462.01 |
| 2011/0163169 A1* | 7/2011 | Saldana | G06K 19/06037 235/494 |

(Continued)

FOREIGN PATENT DOCUMENTS

| | | |
|---|---|---|
| CN | 102270294 | 12/2011 |
| CN | 102750510 | 10/2012 |

(Continued)

OTHER PUBLICATIONS

English translation of relevant portions of CN102270294 Publication Date of CN102270294: Dec. 7, 2011 (Dec. 7, 2011).
(Continued)

*Primary Examiner* — Ahshik Kim
(74) *Attorney, Agent, or Firm* — Hoffman Warnick LLC; Franklin S. Abrams

(57) ABSTRACT

There is provided a combined two-dimensional code generating apparatus, comprising: a two-dimensional code information generating module (1), a key information generating module (3), an abstract computing module (4), a two-dimensional code coding module (5), a two-dimensional code image generating module (6), and a dot matrix image generating module (7), wherein: the two-dimensional code information generating module is configured for generating data information to be coded into the two-dimen- (Continued)

sional code; the key information generating module is configured for generating a key for computing an abstract; the abstract computing module is configured for computing, using a Hash algorithm, the data information of the two-dimensional code and the abstract of the key; the two-dimensional code coding module is configured for combining the abstract information and the data information of the two-dimensional code into coding data of the two-dimensional code; the two-dimensional code image generating module is configured for coding the coding data of the two-dimensional code into the two-dimensional code to generate a two-dimensional code image. The dot matrix image generating module is configured for generating a corresponding dot matrix based on the key information, wherein the dot matrix is positioned by a positioning image of the two-dimensional code and generated outside or inside the two-dimensional code image, the bit error rate caused by the dot matrix being smaller than the error correction rate of the two-dimensional code.

20 Claims, 8 Drawing Sheets

(51) Int. Cl.
*G06K 19/06* (2006.01)
*H04L 9/06* (2006.01)
*H04L 9/08* (2006.01)

(58) Field of Classification Search
USPC .................................................. 235/462.09
See application file for complete search history.

(56) References Cited

U.S. PATENT DOCUMENTS

2015/0108220 A1* 4/2015 Gu .................. G06K 19/06037
235/462.11
2016/0072980 A1* 3/2016 Goktekin ........... H04N 1/32203
358/2.1
2018/0341845 A1* 11/2018 Li ..................... G06K 19/06037

FOREIGN PATENT DOCUMENTS

| CN | 103295046 | 9/2013 |
| CN | 103646333 | 3/2014 |
| CN | 104778589 | 7/2015 |

OTHER PUBLICATIONS

English translation of relevant portions of CN103295046 Publication Date of CN103295046: Sep. 11, 2013 (Sep. 11, 2013).
English translation of relevant portions of CN104778589 Publication Date of CN104778589: Jul. 15, 2015 (Jul. 15, 2015).
English translation of relevant portions of CN102750510 Publication Date of CN102750510: Oct. 24, 2012 (Oct. 24, 2012).
English translation of relevant portions of CN103646333 Publication Date of CN103646333: Mar. 19, 2014 (Mar. 19, 2014).

\* cited by examiner

COMBINED TWO-DIMENSIONAL CODE, ELECTRONIC CERTIFICATE CARRIER, AND GENERATION AND READING APPARATUS AND METHOD

CROSS-REFERENCE TO RELATED APPLICATIONS

This application is a national phase filing under 35 U.S.C. § 371 of PCT International Application PCT/CN2017/115343, filed Dec. 8, 2017, and published under PCT Article 21(2) in Chinese as WO/2018/103755 on Jun. 14, 2018, and claims priority to China Patent Application No. 201611127730.3 filed Dec. 9, 2016. PCT/CN2017/115343 claimed priority benefit of China Patent Application No. 201611127730.3 filed Dec. 9, 2016.

FIELD

Embodiments of the present disclosure relate to fidelity of two-dimensional code information, and more particularly relate to a combined two-dimensional code, a combined two-dimensional code generating apparatus and method, a combined two-dimensional code reading apparatus and method, and applications of the combined two-dimensional code as electronic certificate carriers such as an electronic license, an electronic ID, an electronic order, and an electronic account.

BACKGROUND

With development of electronic industrial and commercial administrations, electronic licenses have been gradually adopted in place of paper licenses. A two-dimensional code has characteristics such as large information volume and error correction functionality. By coding counterpart information of a business license into a two-dimensional code so as to replace a paper business license, use of the license becomes more convenient, which makes it easier to keep, carry, and remotely transmit. The electronic license can be automatically read by an image input device or a photoelectric scanning device. As long as the authenticity of the information is guaranteed, troublesome verification work may be eliminated, which facilitates development of electronic industrial and commercial administrations.

However, as a two-dimensional code is easy to copy and the information therein is easy to falsify, a license authentication service is usually needed to guarantee the authenticity of license information. A user accesses a verification server over network connection to upload to-be-verified information to the server. Whether the license and the information are authentic may be determined by comparing with pre-stored information in the server.

Patent Literature 1 (CN103646333) discloses a method of determining authenticity of a two-dimensional code based on paper texture. The technology of anti-counterfeiting with paper texture has been widely applied to electronic licenses. Thanks to the randomness of texture in paper, a principle of Patent Literature 1 is to print a two-dimensional code on a piece of paper so as to establish an association between the texture as a label and the two-dimensional code, then save the texture in a verification server such that upon verification, information of the two-dimensional code is uploaded and the verification server acquires the corresponding texture image, and then determine authenticity of the two-dimensional code based on texture consistency. However, that technology has the following issues:

(1) As the information in the server needs to be accessed, that technology becomes useless in an environment without network, such that its use scope is very limited;

(2) As verification of the two-dimensional code is performed indirectly via paper, counterfeit becomes possible by cheating the server through not damaging the texture of the paper. For example, if the information of the two-dimensional code is counterfeited by altering, using the error correction function of the two-dimensional code, the color of a texture-free module in the original two-dimensional code, the server may be cheated to make an incorrect determination. That is, the technology in Patent Literature 1 cannot verify the authentication of information in the two-dimensional code;

(3) The whole process is troublesome and inefficient because it is needed to go through the procedures of printing the two-dimensional code on the paper, scanning the texture of the paper, extracting texture features via image processing, establishing an association with the two-dimensional code, and saving the association in the server; besides, it is not completely paper-free.

Patent Literature 2 (Publication No. CN102270294) discloses an anti-counterfeiting technology by using a bar code. In that technology, key information is coded into the bar code; part of information in the two-dimensional code is encrypted by a key to serve as hidden information, such that the plaintext information is made incomplete. Upon verification, the hidden information in the two-dimensional code is decoded using the key in the bar code; if the hidden information and the plaintext information form a complete piece of information, it is determined that the two-dimensional code is authentic. That technology improves the scope of use and convenience due to elimination of the need of access to the network; however, there lacks an objective criterion of determining the association between the hidden information and the plaintext. As a consequence, particularly for a business license, if several "0" are added to the registered capital, such a content association change can hardly be determined, and reliability cannot be guaranteed.

Conventional anti-counterfeiting technologies mentioned above cannot fundamentally prevent falsifying of a two-dimensional code. In the case of encrypting the whole piece of two-dimensional code information, although the risk of counterfeiting may be lowered, it can only be decoded by a dedicated reading device, and such a practice is not suitable for an electronic certificate such as an electronic business license.

SUMMARY

An objective of the present disclosure is to provide a technology which may determine whether two-dimensional code information is authentic without a need of network access so as to solve the above problems in conventional technologies.

A first technical solution of the present disclosure provides a combined two-dimensional code generating apparatus, comprising: a two-dimensional code information generating module (1), a key information generating module (3), an abstract computing module (4), a two-dimensional code coding module (5), a two-dimensional code image generating module (6), and a dot matrix image generating module (7), wherein:

the two-dimensional code information generating module (1) is configured for generating data information to be coded into a two-dimensional code;

the key information generating module (3) is configured for generating a key for computing an abstract;

the abstract computing module (4) is configured for computing, using a Hash algorithm, the data information coded into the two-dimensional code and the abstract of the key;

the two-dimensional code coding module (5) is configured for combining the abstract information and the data information coded into the two-dimensional code into coding data of the two-dimensional code;

the two-dimensional code image generating module (6) is configured for coding the coding data of the two-dimensional code into the two-dimensional code to generate a two-dimensional code image; and the dot matrix image generating module (7) is configured for generating a corresponding dot matrix (100) based on the key information, wherein the dot matrix (100) is positioned by a positioning image (31) of the two-dimensional code (30); the dot matrix (100) is generated outside of an image of the two-dimensional code (30), or at least part of the dot matrix (100) is generated within the image of the two-dimensional code (30) to supersede an overlapping portion of the image of the two-dimensional code; and the dot matrix (100) entering inside the image of the two-dimensional code (30) is set such that a sum of a bit error rate caused by the dot matrix (100) and a bit error rate of the two-dimensional code per se is smaller than an error correction rate of the two-dimensional code.

A second technical solution of the present disclosure is based on the first technical solution, wherein:

the dot matrix image generating module (7) performs redundancy processing to the key information when generating the dot matrix (100), such that the dot matrix (100) has an error correction function, wherein an error correction capacity of the dot matrix (100) is identical to or different from an error correction capacity of the two-dimensional code; and the dot matrix image generating module (7) performs encryption processing to the key information.

A third technical solution of the present disclosure is based on the second technical solution, further comprising:

a key storing module (2) configured for generating a fixed key, wherein the fixed key serves as a public key, and the key generated by the key information generating module (3) serves as a private key; the public key and the private key are combined into the key, available for the abstract computing module (4) to compute the abstract, and the private key is available for the dot matrix image generating module (7) to generate the dot matrix (100).

A fourth technical solution of the present disclosure is based on the third technical solution, wherein the key information generating module (3) generates the key randomly, and whist generating the dot matrix (100), the dot matrix image generating module (7) generates a dot matrix positioning image (51) for position detection.

A fifth technical solution of the present disclosure is based on any one of the first through fourth technical solutions, wherein the algorithm adopted by the abstract computing module (4) for computing the abstract refers to any one of CRC8, CRC16, CRC32, MD2, MD4, MD5, SHA1, SHA256, SHA384, SHA512, RIPEMD, PANAMA, TIGER, ADLER32.

A sixth technical solution of the present disclosure provides a combined two-dimensional code generating apparatus, comprising: a two-dimensional code information generating module (1), a key information generating module (3), an abstract computing module (4), a two-dimensional code coding module (5), and a two-dimensional code image generating module (6), wherein:

the two-dimensional code information generating module (1) is configured for generating data information to be coded into the two-dimensional code;

the key information generating module (3) is configured for generating a key for computing an abstract;

the abstract computing module (4) is configured for computing, using a Hash algorithm, the data information coded into the two-dimensional code and the abstract of the key;

the two-dimensional code coding module (5) is configured for combining the abstract information, the key information, and the data information coded into the two-dimensional code into coding data of the two-dimensional code; and the two-dimensional code image generating module (6) is configured for coding the coding data of the two-dimensional code into the two-dimensional code to generate a two-dimensional code image.

A seventh technical solution of the present disclosure provides a combined two-dimensional code generating method, comprising steps of:

Step S1: generating data information to be coded into a two-dimensional code;

Step S2: generating a key for computing an abstract;

Step S4: computing, using a Hash algorithm, the data information coded into the two-dimensional code and the abstract of the key;

Step S5: combining the abstract information and the data information coded into the two-dimensional code into coding data of the two-dimensional code;

Step S6: coding the coding data of the two-dimensional code into the two-dimensional code to generate a two-dimensional code image;

Step S7: determining a setting region of a dot matrix (100) based on a positioning image (31) of the two-dimensional code (100), wherein the setting region is disposed outside of a two-dimensional code image (30) or is at least partially disposed within the two-dimensional code image (30) to supersede an overlapping portion of the two-dimensional code image, wherein the dot matrix (100) entering inside the two-dimensional code image (30) is set such that a sum of a bit error rate caused by the dot matrix (100) and a bit error rate of the two-dimensional code per se is smaller than an error correction rate of the two-dimensional code; and Step S8: generating, based on the key, the dot matrix (100) corresponding to the key in the setting region.

An eighth technical solution of the present disclosure is based on the seventh technical solution, wherein:

in the step S8, upon generation of the dot matrix (100), redundancy processing is performed to the key information to impart an error correction function to the dot matrix (100), wherein an error correction capacity of the dot matrix (100) is identical to or different from an error correction capacity of the two-dimensional code; and the key information is subjected to encryption processing.

A ninth technical solution of the present disclosure is based on the eighth technical solution, further comprising:

Step S3: generating a fixed key, wherein the fixed key serves as a public key, and the key generated in the step S2 serves as a private key; the public key and the private key are combined into the key available for computing the abstract in the step S4, and the private key is available for generating the dot matrix (100) in the step S8.

A tenth technical solution of the present disclosure is based on the ninth technical solution, wherein in the step 3, the key is randomly generated.

An eleventh technical solution of the present disclosure is based on the tenth technical solution, wherein a dot matrix positioning image (51) for position detection is generated whilst the dot matrix (100) is generated.

A twelfth technical solution of the present disclosure is based on any one of the seventh through eleventh technical solutions, wherein in the step S4, the abstract is computed using any one of CRC8, CRC16, CRC32, MD2, MD4, MD5, SHA1, SHA256, SHA384, SHA512, RIPEMD, PANAMA, TIGER, ADLER32.

A thirteenth technical solution of the present disclosure provides a combined two-dimensional code reading apparatus for reading data information in a combined two-dimensional code, the combined two-dimensional code comprising a two-dimensional code and a dot matrix, the data information and abstract information being coded into the two-dimensional code, key information being coded into the dot matrix, the abstract information being computed based on the data information and the key information using a Hash algorithm, the combined two-dimensional code reading apparatus comprising:

an image acquiring module (11), a two-dimensional code decoding module (12), a dot matrix decoding module (13), an abstract computing module (15), a correctness verifying module (16), and a displaying module (17), wherein:

the image acquiring module (11) is configured for acquiring an image of the combined two-dimensional code;

the two-dimensional code decoding module (12) is configured for decoding the two-dimensional code (30) in the combined two-dimensional code to obtain the data information and the abstract information;

the dot matrix decoding module (13) is configured for decoding the dot matrix (100) in the combined two-dimensional code to obtain the key information;

the abstract computing module (15) is configured for computing, using a same method as computing an abstract in the combined two-dimensional code, an abstract of synthesized information which results from synthesizing the data information obtained from decoding the two-dimensional code and the key information;

the correctness verifying module (16) is configured for comparing the computed abstract information with the abstract information obtained from decoding the two-dimensional code (30) to determine a consistency therebetween; and the displaying module (17) is configured for displaying or performing a corresponding operation on a pass or a failure of verifying the data information based on a verification result of the correctness verifying module (16).

A fourteenth technical solution of the present disclosure is based on the thirteenth technical solution, wherein the abstract in the combined two-dimensional code is computed by a key including a public key and a private key, and the private key information is coded into the dot matrix, the combined two-dimensional code reading apparatus further comprises a public key storing module (14); and the abstract computing module (15) computes, using a same method as computing an abstract in the combined two-dimensional code, an abstract of synthesized information which results from synthesizing the data information obtained from decoding the two-dimensional code, the public key in the public key storing module (14), and the key obtained from decoding the dot matrix (100).

A fifteenth technical solution of the present disclosure provides a combined two-dimensional code reading method for reading data information in a combined two-dimensional code, the combined two-dimensional code comprising a two-dimensional code and a dot matrix, data information and abstract information being coded into the two-dimensional code, key information being coded into the dot matrix, the abstract information being computed using a Hash algorithm based on the data information and the key information, the combined two-dimensional code reading method comprising:

Step S100: obtaining an image of a combined two-dimensional code;

Step S110: decoding a two-dimensional code (30) in the combined two-dimensional code to obtain the data information and the abstract information;

Step S120: decoding the dot matrix (100) in the combined two-dimensional code to obtain the key information;

Step S140: computing, using a same method as computing an abstract in the combined two-dimensional code, an abstract of synthesized information which results from synthesizing the data information obtained from decoding the two-dimensional code and the key information;

Step S150: comparing the computed abstract information with the abstract information obtained from decoding the two-dimensional code (30);

Step S160: determining whether the two pieces of abstract information are consistent;

Step S170: in the case of consistency, displaying or performing a corresponding operation on a pass of verification of the data information; and Step S180: in the case of inconsistency, displaying or performing a corresponding operation on a failure of verification of the data information.

A sixteenth technical solution of the present disclosure is based on the fifteenth technical solution, a key in the combined two-dimensional code including a public key and a private key, the private key information being coded into the dot matrix, the combined two-dimensional code reading method further comprises step S130, wherein:

in Step S120: the dot matrix (100) in the combined two-dimensional code is decoded to obtain private key information;

in Step S130: the stored public key information is inputted;

In Step S140: an abstract of synthesized information which results from synthesizing the data information obtained from decoding the two-dimensional code and the key information is computed using a same method as computing an abstract in the combined two-dimensional code.

A seventeenth technical solution of the present disclosure provides a combined two-dimensional code, comprising: a two-dimensional code (30) and a dot matrix (100), wherein at least part of the dot matrix (100) is disposed at a position inside the two-dimensional code (30) where a positioning image (31) is not blocked; the dot matrix (100) is positioned by the positioning image (31) of the two-dimensional code (30) and associated with the two-dimensional code (30) in terms of image; a size of a setting region (40) of the dot matrix 100 is associated with an error correction level and an area of the two-dimensional code (30), such that a sum of a bit error rate caused by the dot matrix (100) and a bit error rate of the two-dimensional code per se is smaller than an error correction rate of the two-dimensional code; data information and abstract information are coded in the two-dimensional code (30); and key information for computing an abstract is coded into the dot matrix (100), the abstract information being computed using a Hash algorithm based on the key information and the data information.

An eighteenth technical solution of the present disclosure provides a combined two-dimensional code, comprising a two-dimensional code (30) and a dot matrix (100), wherein the dot matrix (100) is disposed outside of an image of the two-dimensional code (30), the dot matrix (100) being positioned by a positioning image (31) of the two-dimensional code (30) and associated with the two-dimensional code (30) in terms of image;

data information and abstract information are coded in the two-dimensional code (30), key information for computing an abstract being coded into the dot matrix (100), the abstract information being computed using a Hash algorithm based on the key information and the data information.

A nineteenth technical solution of the present disclosure is based on the seventeenth or eighteenth technical solution, wherein the dot matrix (100) is disposed within the two-dimensional code (30) or at at least one side edge of the two-dimensional code (30) in a form of one or more dot matrixs.

A twentieth technical solution of the present disclosure is based on the seventeenth or eighteenth technical solution, wherein dark-colored dots in the dot matrix 100 comprise round dots or characters and an image, and a certain interval is maintained between neighboring dark-colored dots so as to enhance image processing efficiency and visual effect.

A twenty-first technical solution of the present disclosure is based on the seventeenth or eighteenth technical solution, wherein modules in the dot matrix (100) are identical to modules in the two-dimensional code (30) in terms of shape, size, internal and position, such that when the dot matrix (100) is embedded into the two-dimensional code (30), the visual effect is maintained consistent with surrounding modules of the two-dimensional code (30).

A twenty-second technical solution of the present disclosure provides an application of a combined two-dimensional code as an electronic certificate carrier, wherein the combined two-dimensional code refers to any combined two-dimensional code in any of the seventeenth through twenty-first technical solutions.

A twenty-third technical solution of the present disclosure is based on the twenty-first technical solution, wherein the electronic certificate is an electronic license file.

A twenty-fourth technical solution of the present disclosure is based on the twenty-first technical solution, wherein the electronic certificate is an electronic identity file.

A twenty-fifth technical solution of the present disclosure is based on the twenty-first technical solution, wherein the electronic certificate is an electronic order file.

A twenty-sixth technical solution of the present disclosure is based on the twenty-first technical solution, wherein the electronic certificate is an electronic account file.

The present disclosure offers the following effects:

the combined two-dimensional code generating apparatus and method according to the present disclosure may generate a combined two-dimensional code in a simple and low-cost way;

the combined two-dimensional code reading apparatus and method according to the present disclosure may read a combined two-dimensional code in a simple and low-cost way; and the present disclosure may directly verify the authenticity of data information in the two-dimensional code. Compared with conventional indirect determination schemes, the present disclosure has a high reliability and a strong data information fidelity.

DETAILED DESCRIPTION OF EMBODIMENTS

Hereinafter, embodiments of the present disclosure will be illustrated. The specific examples described in the embodiments of the present disclosure only serve as exemplary illustrations of the preferred embodiments of the present disclosure, not constituting a limitation to the scope of the present disclosure.

First, a combined two-dimensional code according to the present disclosure will be explained.

Embodiment 1

Figure 1:
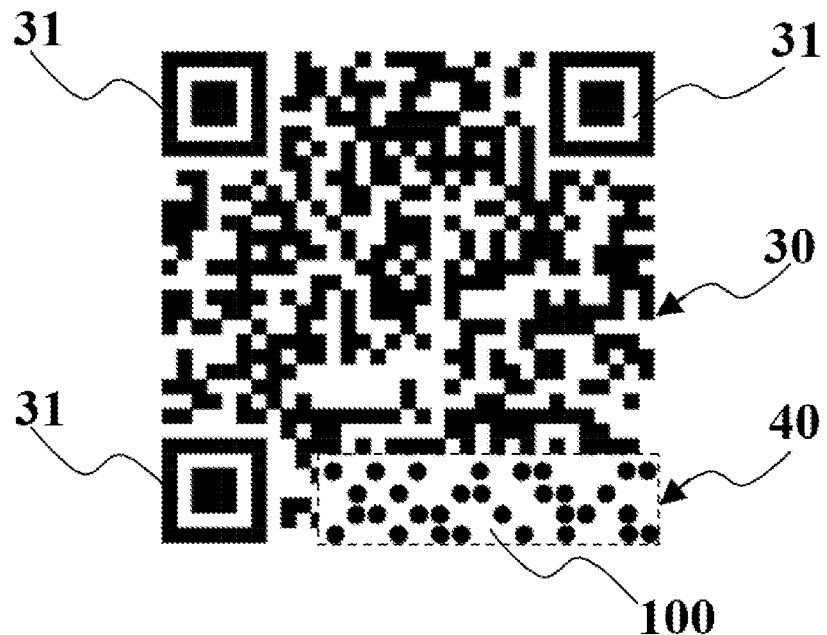
FIG. 1 shows a schematic diagram of components of a combined two-dimensional code (where the dot matrix is within the two-dimensional code)

FIG. 1 shows a schematic diagram of components of a combined two-dimensional code. As illustrated in FIG. 1, the combined two-dimensional code comprises two parts: a two-dimensional code 30 and a dot matrix 100, wherein a setting region 40 of the dot matrix 100 is disposed at the right lower portion (where no positioning images are present) of the two-dimensional code 30, the setting region 40 being positioned by three positioning images 31 of the two-dimensional code 30 at two side-edge positions and associated with the two-dimensional code 30 in terms of image.

In this embodiment, the rectangular setting region 40 is divided into 4*16 modules for coding. The dark-colored dot matrix 100 and the white portion form two states of binary information, wherein one dark-colored round dot and a white portion of a corresponding size represent one bit respectively; a certain interval is maintained between neighboring dark-colored round dots in the dot matrix 100 to avoid mutual connection, thereby improving image processing efficiency and visual effect. As the shape of the dot matrix 100 is different from the shape of the rectangular module in the two-dimensional code 30, the dot matrix 100 may further play a role of identifying the two-dimensional code.

The size of the setting region 40 of the dot matrix 100 is set with reference to an error correction level (error correction capacity) of the two-dimensional code 30, i.e., relative to the image area of the two-dimensional code 30, a higher error correction level results in a larger setting region 40 of the dot matrix 100, such that a sum of the bit error rate caused by the dot matrix 100 and the bit error rate of the two-dimensional code per se is smaller than the error correction rate of the two-dimensional code, which may guarantee that decoding of the two-dimensional code is not affected and may offer the dot matrix 100 a larger area. Because the bit error rate of the two-dimensional code is not only affected by the size of the dot matrix region 40 but also affected by the information coded into the dot matrix 100, in order to avoid a condition that change of the coded information causes the two-dimensional code 30 to be undecodable, a full margin is reserved when setting the size of the setting region 40 based on the error correction level. The full margin may be determined through experiments. For example, determining a region upper limit value allowed to be set in an extreme circumstance based on the coding information (modular distribution) of the two-dimensional code. How to set the size of the setting region 40 based on the upper limit value may optionally refer to the technology disclosed in the issued publication No. CN101615258B (application No. 200810115748.0), the Inventor of which is the Inventor of the present disclosure, which is thus not detailed here.

An aspect ratio and shape of the setting region 40 may be arbitrarily set. The dot matrix 100 may optionally be partially disposed outside of the image region of the two-dimensional code 30 so as to improve the information volume of the dot matrix 100.

As the size of the setting region 40 is associated with the error correction level, the size of the setting region 40 may be automatically adjusted based on the error correction level of the two-dimensional code 30 when compiling the combined two-dimensional code; upon reading, a read region of the dot matrix 100 may be determined based on parameters such as version and error correction level of the two-dimensional code 30, which facilitates information processing.

The dot matrix 100 may optionally not adopt a shape of dark-colored round dots, but adopt a shape of characters or other patterns, as long as it may be identified as a standalone module. The dot matrix 100 may optionally adopt a size and a shape identical to the two-dimensional code 30.

In this embodiment, the combined two-dimensional code is applied as an electronic business license. The two-dimensional code 30 adopts a QR code in compliance with the national standard GB/T18284-2000 such that it may be compiled and decoded by any coding device and reading device meeting the national standard. Counterpart information and abstract information of the business license are coded into the two-dimensional code 30; key information for computing an abstract is coded into the dot matrix 100; like the two-dimensional code 30, the dot matrix 100 is also coded using the Reed-Solomon codes, so as to impart an error correction rate to the information in the dot matrix 100. The abstract information is computed using the MD5 algorithm based on the key information and the counterpart information of the electronic business license.

Because such an abstract algorithm as MD5 (e.g., Hash algorithm) has a characteristic that if the information is identical, the computed abstract is also identical, as long as the information in the two-dimensional code 30 is inconsistent with the original information compiled by the industrial and commercial administration authority, the computed abstract will be different from the original one compiled upon issuance of the counterpart of the license. In this way, whether the license counterpart information in the two-dimensional code is falsified may be verified, thereby guaranteeing the authenticity of the electronic license information.

What have been described above are the structure of the combined two-dimensional code and its application as an electronic business license. It is seen that because the dot matrix 100 is added inside the two-dimensional code 30, the special structure of the dot matrix 100 visually plays a role of labeling the business license. When reading the combined two-dimensional code using an image input device or a photoelectric scanning device, the setting region 40 of the dot matrix 100 may be positioned using a positioning image 31 of the two-dimensional code to determine a reading position of the dot matrix 100; the abstract is computed using the MD5 algorithm based on the key information obtained from decoding the dot matrix 100 and the counterpart information of the electronic business license obtained from decoding the two-dimensional code 30; and by comparing the computed abstract with the abstract obtained from decoding the two-dimensional code, it may be determined whether the counterpart information of the electronic business license in the two-dimensional code 30 is authentic. The whole process needs no access to the network or the server, which thus broadens the scope of use.

Figure 2:
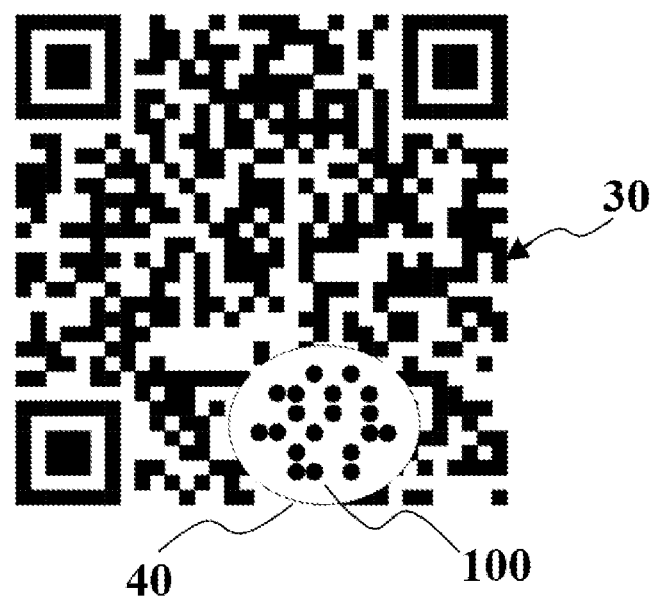
FIG. 2 shows a schematic diagram of a varied example of the combined two-dimensional code of FIG. 1.

FIG. 2 is a varied example of FIG. 1. As shown in FIG. 2, the setting region 40 of the dot matrix 100 is set into an oval shape, while the remaining structure is identical.

Figure 3:
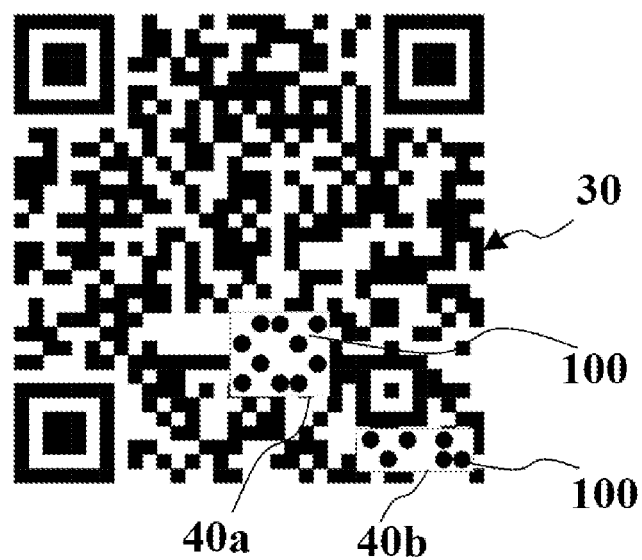
FIG. 3 shows a schematic diagram of a varied example of the combined two-dimensional code of FIG. 1.

FIG. 3 is a varied example of FIG. 1. As shown in FIG. 3, the setting region 40 comprises two different shapes of setting regions 40a and 40b at different positions, while the remaining structure is identical.

Embodiment 2

Hereinafter, illustration will be made to a structure of another combined two-dimensional code.

Figure 4:
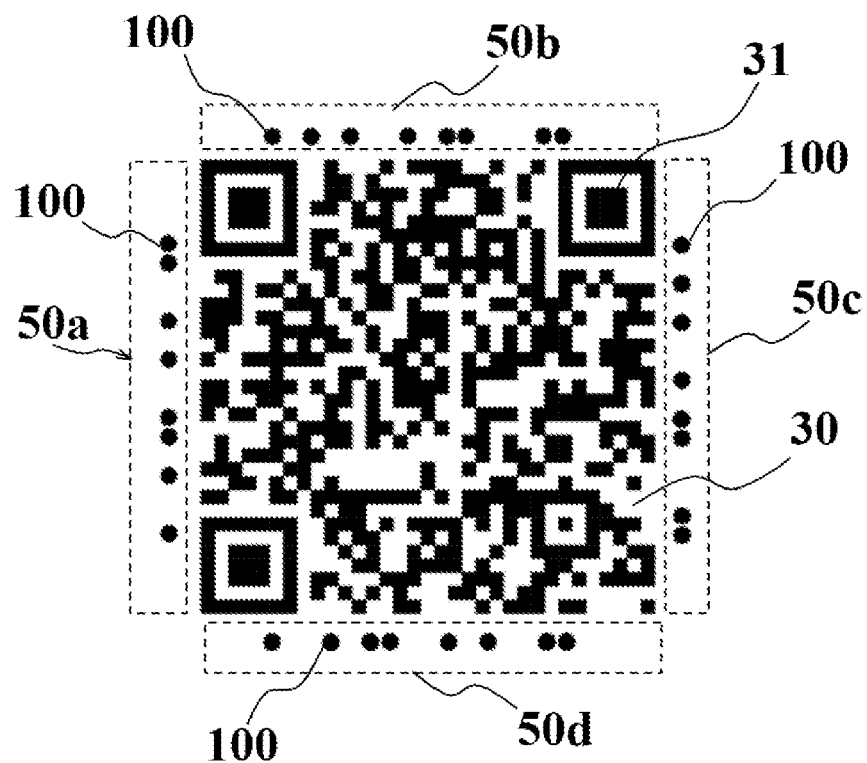
FIG. 4 shows a schematic diagram of components of another combined two-dimensional code (with multi-edge single-row dot matrixs)

FIG. 4 shows a schematic diagram of components of another combined two-dimensional code. Its difference from FIG. 1 lies in that the setting region 50 of the dot matrix 100 comprises 50a, 50b, 50c, and 50d, which are respectively disposed outside of respective side edges of the image of the two-dimensional code 30, wherein the dot matrix 100 has a multi-edge single-row structure. Identical to the structure of FIG. 1, the setting regions 50a, 50b, 50c, and 50d are positioned by positioning images 31 of the two-dimensional code 30 and are spaced with the side edges at a certain interval. The size of the setting region 50 is associated with the size of the two-dimensional code 30. As the dot matrix 100 does not affect decoding of the two-dimensional code 30, the range of the setting region 50 needs not be associated with the error correction level of the two-dimensional code 30, such that a larger information volume may be set.

The setting region 50 may also use a blank area surrounding the two-dimensional code image.

Figure 5:
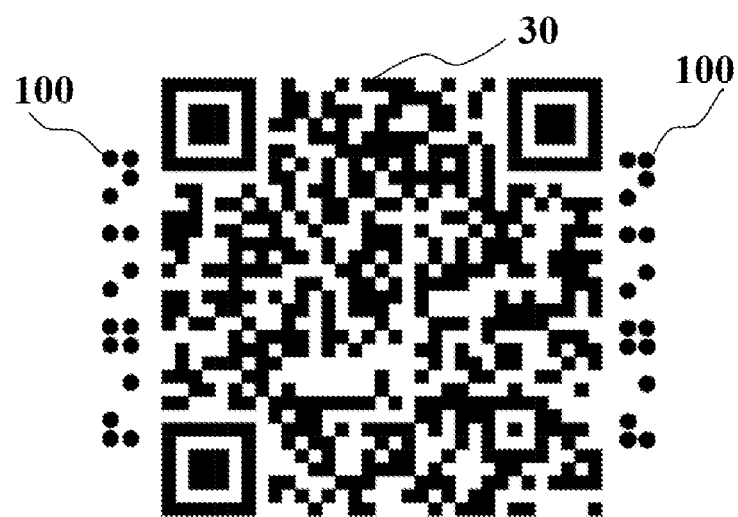
FIG. 5 shows a schematic diagram of a varied example of the combined two-dimensional code of FIG. 4.

FIG. 5 is a varied example of FIG. 4. In FIG. 5, the setting regions of the dot matrixs 100 change from the four groups in FIG. 4 to two groups, with one being disposed on the left and one being disposed on the right, and two rows of dot matrixs 100 are arranged in each setting region; the total information volume of the dot matrixs are identical to that in FIG. 4. The remaining structure is identical to FIG. 4.

Figure 6:
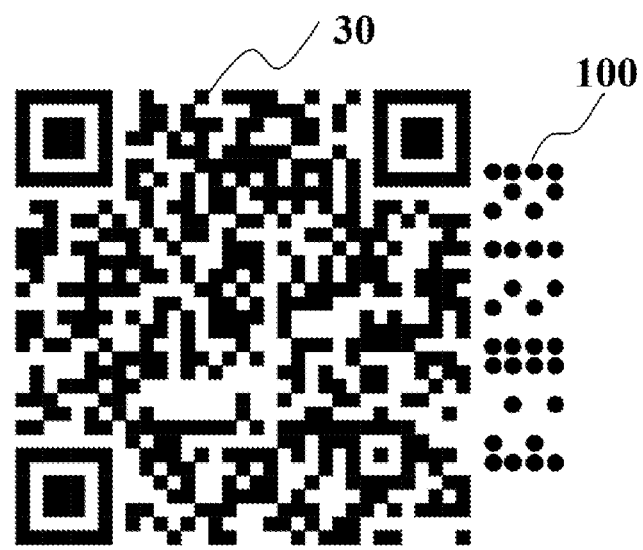
FIG. 6 shows a schematic diagram of another varied example of the combined two-dimensional code of FIG. 4.

FIG. 6 is a varied example of FIG. 4. In FIG. 6, the setting region of the dot matrixs 100 changes from the four groups in FIG. 4 to one group disposed on the right, four rows of dot matrixs 100 are arranged in the setting region, and the total information volume of the dot matrixs are identical to that in FIG. 4. The remaining structure is identical to FIG. 4.

Figure 7:
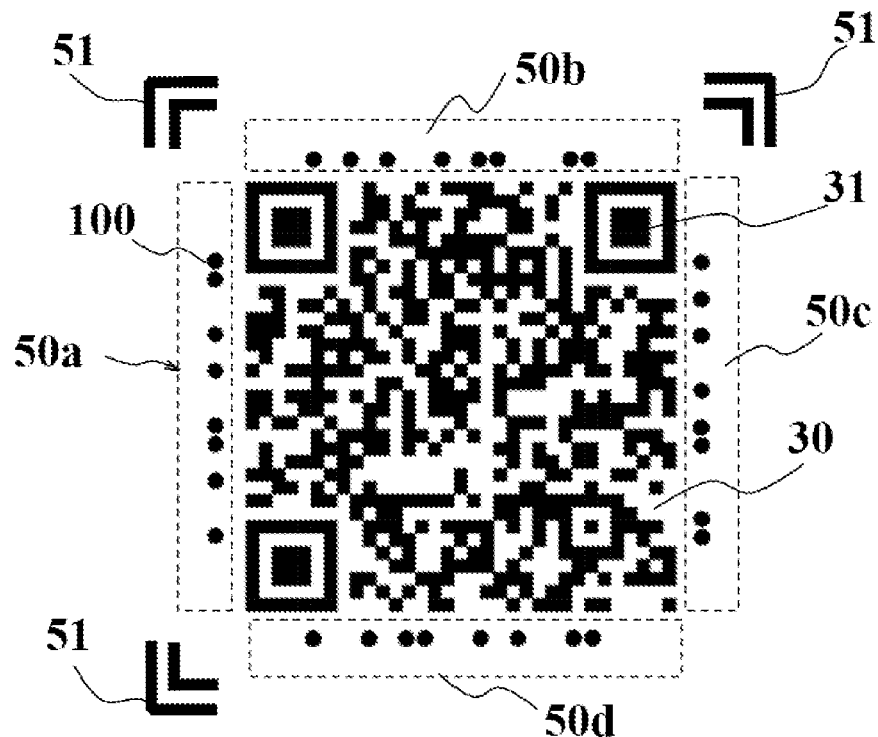
FIG. 7 shows a schematic diagram of a combined two-dimensional code with a positioning mechanism.

FIG. 7 is a varied example of FIG. 4. In FIG. 7, three dot matrix positioning images 51 are arranged outside of the dot matrix 100, disposed outside of the three positioning images 31 of the two-dimensional code 30, respectively. The positions and ranges of the dot matrixs 100 are determined based on the three dot matrix positioning images 51. The dot matrix positioning images 51 have a specific shape, available for the image input device or the photoelectric scanning device to read. Meanwhile, the dot matrix positioning images 51 further play a role of labeling the scope of the combined two-dimensional code, which facilitates determining of the scanning scope.

Hereinafter, illustration will be made to the combined two-dimensional code generating apparatus and method of the present disclosure.

Figure 8:
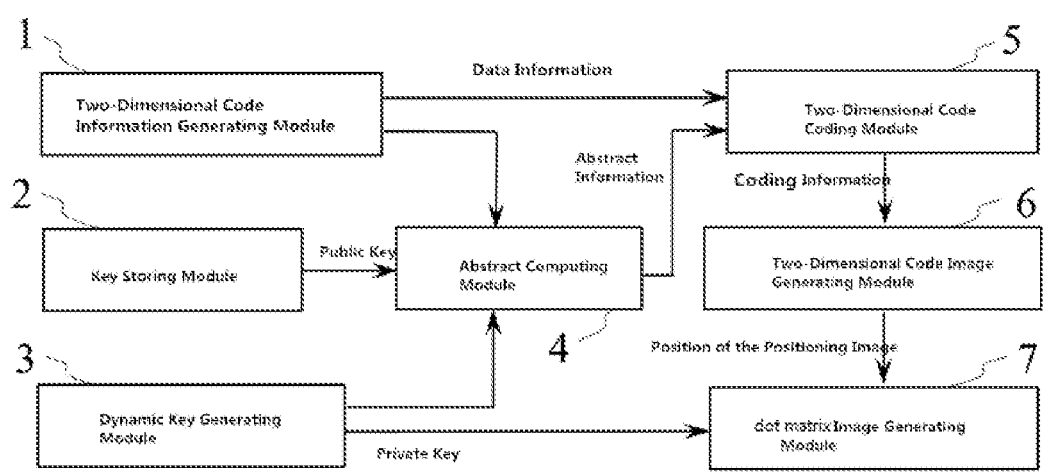
FIG. 8 shows a structural block diagram of a combined two-dimensional code generating apparatus according to the present disclosure.

FIG. 8 shows a structural block diagram of a combined two-dimensional code generating apparatus according to the present disclosure. As illustrated in FIG. 8, the combined two-dimensional code generating apparatus comprises a two-dimensional code information generating module 1, a key storing module 2, a dynamic key generating module 3, an abstract computing module 4, a two-dimensional code coding module 5, a two-dimensional code image generating module 6, and a dot matrix image generating module 7.

The two-dimensional code information generating module 1 is connected to the abstract computing module 4 and the two-dimensional code coding module 5; the key storing module 2 is connected to the abstract computing module 4; the dynamic key generating module 3 is connected to the abstract computing module 4 and the dot matrix image generating module 7; the abstract computing module 4 is connected to the two-dimensional code coding module 5; the two-dimensional code coding module 5 is connected to the two-dimensional code image generating module 6; and the two-dimensional code image generating module 6 is connected to the dot matrix image generating module 7.

The two-dimensional code information generating module 1 is configured for generating data information to be coded into a two-dimensional code. In this embodiment, the two-dimensional code is used as an electronic business license. The information to be coded into the two-dimensional code is generated based on counterpart information of the electronic business license and inputted into the two-dimensional code coding module 5 and the abstract computing module 4.

The key storing module 2 stores a fixed key. In this embodiment, the key is a public key assigned by an industrial and commercial administration authority, which is the same for all enterprises. The public key is inputted into the abstract computing module 4.

The dynamic key generating module 3 is configured for generating an individual key for each enterprise (i.e., electronic license). The key may be generated randomly. The key as a private key is inputted into the abstract computing module 4.

The abstract computing module 4 is configured for computing an abstract using an MD5 algorithm based on counterpart information of the electronic business license, public key information, and private key information, the abstract being inputted into the two-dimensional code coding module 5.

The two-dimensional code coding module 5 combines the counterpart information of the electronic business license and the abstract information into coding data of the two-dimensional code. Upon combination, the abstract information may be labeled with a special character. By labeling the abstract information with a special character, it may be opted to display or not to display the abstract information based on the special character upon reading.

Figure 10:
FIG. 10 shows a schematic diagram of generating a two-dimensional code.

The two-dimensional code image generating module 6 is configured for generating a QR code shown in FIG. 10 based on the coding data, the generated QR code being inputted into the dot matrix image generating module 7.

The dot matrix image generating module 7 is configured for determining setting regions 50a, 50b, 50c, and 50d of the dot matrix 100 based on positioning images 31 (shown in FIG. 11) in the QR code, and generating the dot matrix 100 in respective setting regions based on the private key information, the private key being coded into the dot matrix 100 by encryption.

Figure 9:
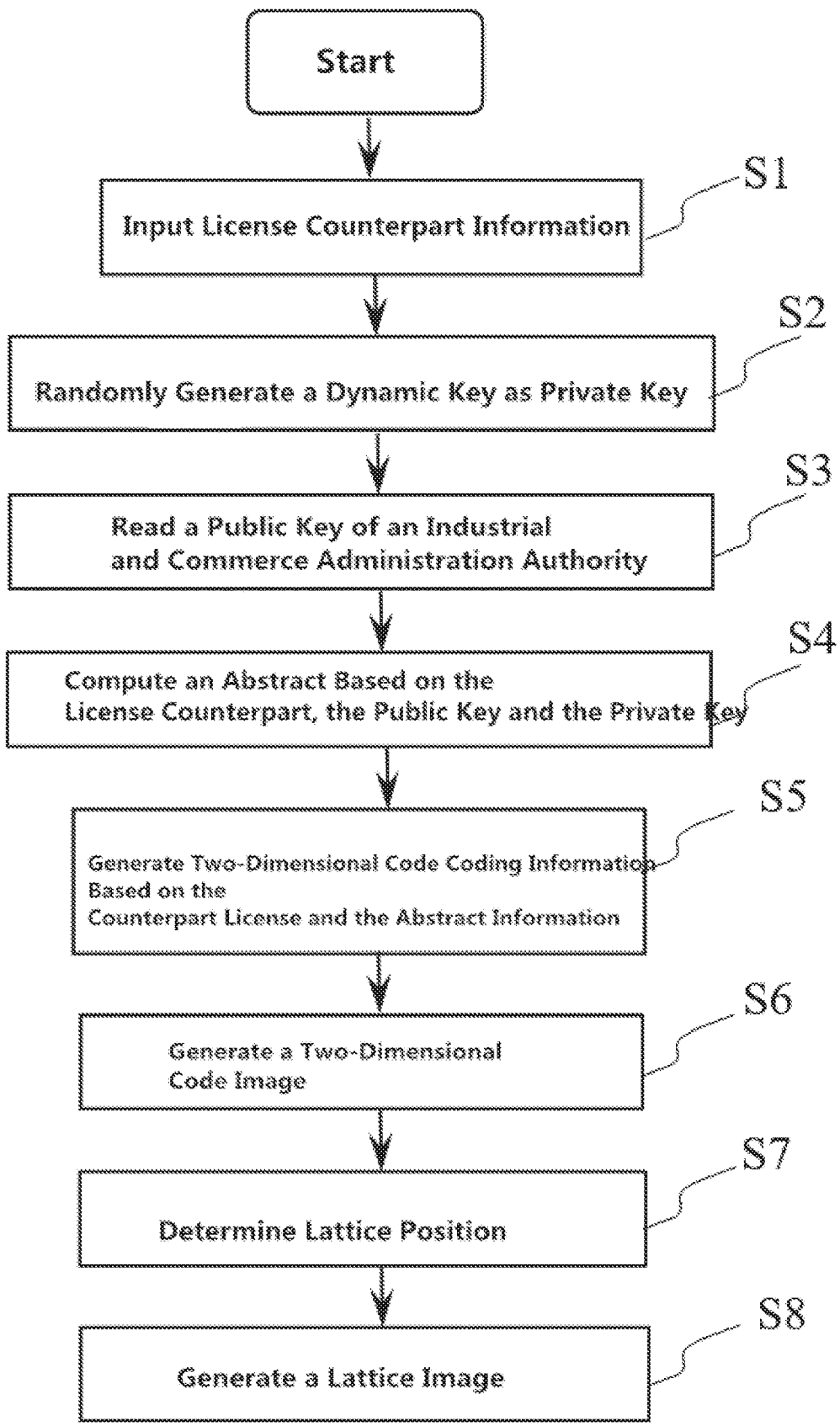
FIG. 9 shows a flow diagram of a combined two-dimensional code generating method.

FIG. 9 shows a flow diagram of a combined two-dimensional code generating method.

Hereinafter, illustration will be made to the combined two-dimensional code generating method according to the present disclosure with reference to the apparatus of FIG. 8 and specific data (virtual data for ease of illustration).

Step S1: inputting counterpart information of an electronic business license into a two-dimensional code information generating module 1 to generate data information for coding a two-dimensional data.

The counterpart information of the electronic business license is provided below:
Uniform Social Credit Code: 81210108MA003JQGOW
Name: Beijing Rocket Technology Co., Ltd.
Kind: Limited Liability Company (Invested or Controlled by Natural Person)
Address: Suite 3020, Hangkong Building, No. 100, Beisihuan Middle Road, Haidian District, Beijing
Legal Representative: ZHANG San
Registered Capital: RMB 1, 500,000 yuan
Date of Establishment: Nov. 2, 2015
Term: Nov. 2, 2015-Nov. 1, 2035
Scope of Businesses: technology development, technology promotion, technology consultancy, technology service, technology transfer; software development; software consultancy.

Step S2: randomly generating, by a dynamic key generating module 3, a key mfuw4aly6j, wherein the key serves as a private key of the electronic business license, which is different for each to-be-compiled two-dimensional code.

Step S3: reading, by a key storing module 2, a public key alk3p3bv84231j6g assigned by an industrial and commercial administration authority, which is the same for all enterprises and does not vary with electronic business licenses.

Step S4: computing, by an abstract computing module 4 using an MD5 algorithm, abstract information Y9m7cDBwcv7KLCoy45i+nA==based on a combination of the counterpart information of the electronic business license, the public key alk3p3bv84231j6g, and the private key mfuw4aly6j.

Step S5: combining, by the two-dimensional code coding module 5, the counterpart information of the electronic business license and the abstract information Y9m7cDBwcv7KLCoy45i+nA== into coding data of the two-dimensional code, wherein upon combination, the abstract information Y9m7cDBwcv7KLCoy45i+nA== is labeled with a special character.

Step S6: generating, by the two-dimensional code image generating module 6, a QR code (shown in FIG. 10) based on the coding data. As the two-dimensional code 30 is a standard code and the information is plaintext, it may be automatically read by a universal image recognition device or optical image recognition device.

Figure 11:
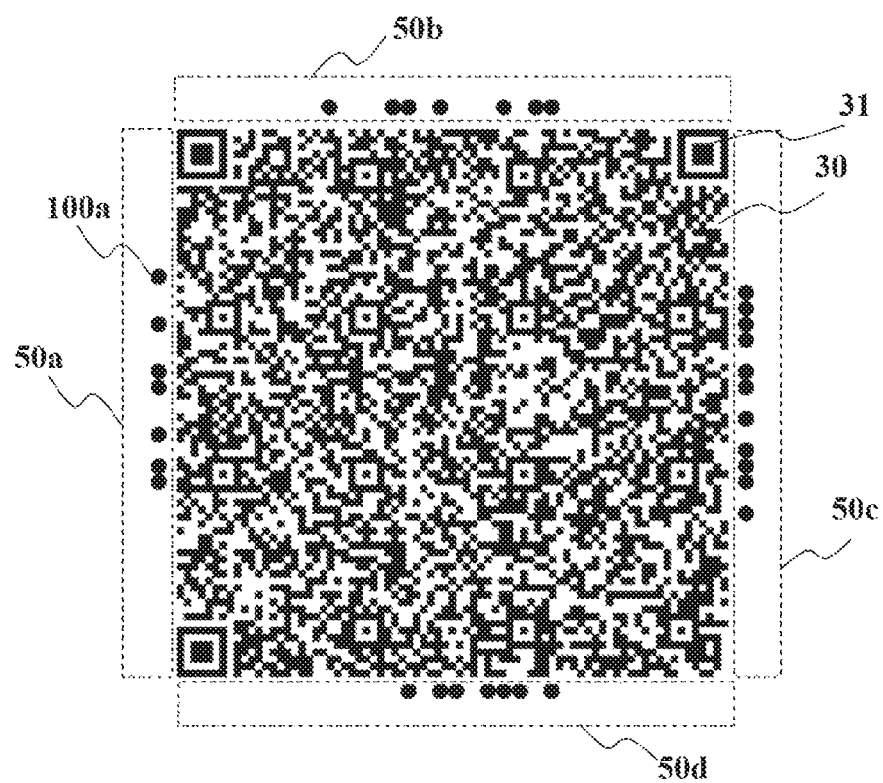
FIG. 11 shows a schematic diagram of generating a dot matrix.

Step S7: determining, by a dot matrix image generating module 7, a setting region of a dot matrix based on a position of a positioning image 31 in the QR code 30 according to a preset condition. As shown in FIG. 11, setting regions 50a, 50b, 50c, and 50d are respectively formed outside of respective side edges of the two-dimensional code 30, thereby forming the dot matrix 100.

Step 8: generating, by the dot matrix image generating module 7, the dot matrix 100 shown in FIG. 11 in the setting region based on the private key information. When generating the dot matrix 100, redundancy is added to impart an error correction capability to the information in the dot matrix 100. The error correction rate of the dot matrix 100 may be identical to or different from the error correction rate of the two-dimensional code 30.

What have been illustrated above are the combined two-dimensional code generating apparatus and method according to the present disclosure. It may be seen that a combined two-dimensional code having an authenticity verification function may be generated only by adding a public key and a private key based on the conventional two-dimensional code generating apparatus and method, then combining the public key and private key information with counterpart information of the electronic business license, computing an abstract using the MD5 algorithm, coding the abstract information and the counterpart information of the electronic business license into the two-dimensional code 30, and coding the private information into the dot matrix 100. As the information in the two-dimensional code is not encrypted, it may be recognized by a common universal image input device or photoelectric scanning device without a need of a dedicated reading device, which facilitates use. A recognition device provided with a dot matrix reading module and an abstract computing module may determine whether the information in the two-dimensional code is authentic counterpart information of the electronic business license as long as the abstract information, which is computed based on the information obtained from decoding the two-dimensional code, the private key information, and the public key information, is consistent with the abstract information obtained from decoding the two-dimensional code. In this way, the authenticity of the two-dimensional code may be verified without access to the network. Even without encrypting the counterpart information of the electronic business license, counterfeiting or falsifying of the counterpart information of the electronic business license can be stilled prevented, and authenticity of the two-dimensional code information can be guaranteed.

Hereinafter, illustration will be made to a reading apparatus and method of the present disclosure.

Figure 12:
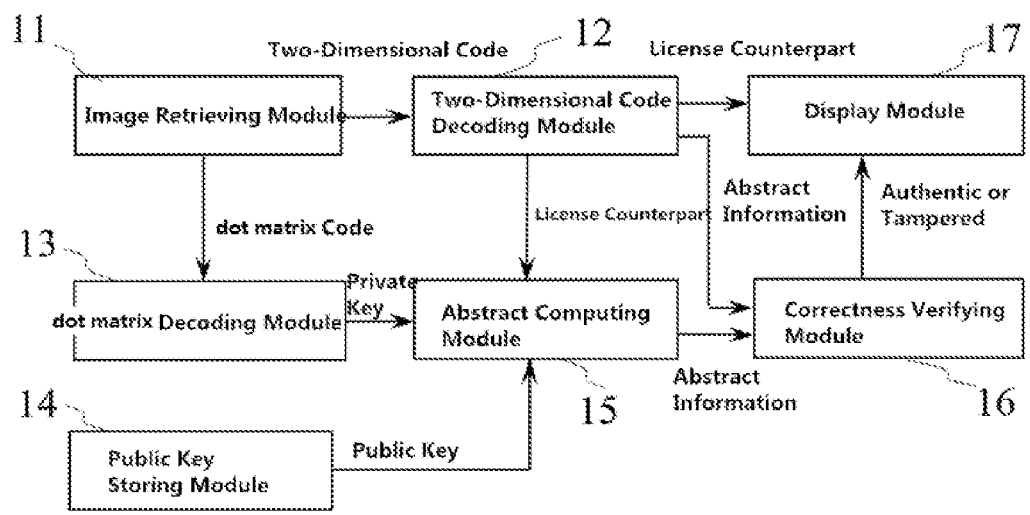
FIG. 12 shows a structural block diagram of a combined two-dimensional code reading apparatus.

FIG. 12 shows a structural block diagram of a combined two-dimensional code reading apparatus. As shown in FIG. 12, the two-dimensional code reading apparatus comprises: an image acquiring module 11, a two-dimensional code decoding module 12, a dot matrix decoding module 13, a public key storing module 14, an abstract computing module 15, a correctness verifying module 16, and a displaying module 17.

The image acquiring module 11 is connected to the two-dimensional code decoding module 12 and the dot matrix decoding module 13; the dot matrix decoding module 13, the public key storing module 14 and the two-dimensional code decoding module 12 are connected to the abstract computing module 15; the two-dimensional code decoding module 12 is connected to the correctness verifying module 16 and the displaying module 17; the correctness verifying module 16 is connected to the displaying module 17.

The image acquiring module 11 is configured for acquiring an image of the combined two-dimensional code.

The two-dimensional code decoding module 12 is configured for decoding information of a two-dimensional code 30 in the combined two-dimensional code.

The dot matrix decoding module 13 is configured for decoding information of a dot matrix in the combined two-dimensional code.

The public key storing module 14 is configured for storing a public key. In this embodiment, the public key stored is the key alk3p3bv84231j6g assigned by an industrial and commercial administration authority.

The abstract computing module 15 is configured for computing an abstract using an MD5 algorithm based on the information obtained from decoding the two-dimensional code, the public key, and the private key.

The correctness verifying module 16 is configured for comparing the computed abstract information with the abstract information obtained by decoding the two-dimensional code 30 to determine a consistency therebetween.

The displaying module 17 is configured for displaying data information obtained from decoding the two-dimensional code. Meanwhile, the displayed information is labeled with pass or failure of the verification based on a verification result of the correctness verifying module 16.

Hereinafter, illustration will be made to the combined two-dimensional code reading method according to the present disclosure with reference to the apparatus of FIG. 12.

Figure 13:
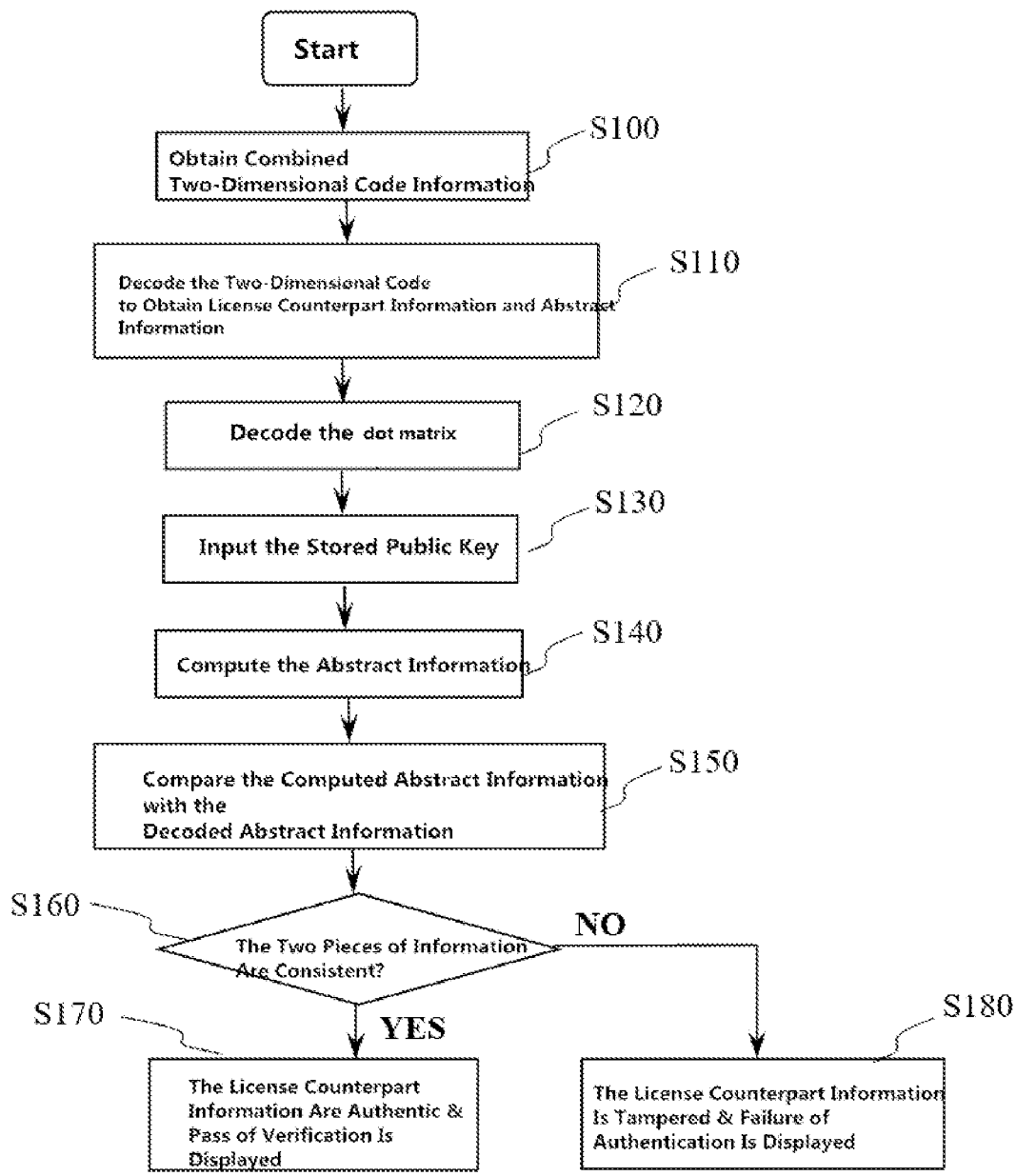
FIG. 13 shows a flow diagram of a combined two-dimensional code reading method.

FIG. 13 shows a flow diagram of a combined two-dimensional code reading method.

Step S100: acquiring, by an image acquiring module 11, an image of the combined two-dimensional code.

Step S110: decoding, by a two-dimensional code decoding module 12, a two-dimensional code 30 in the combined two-dimensional code, to obtain counterpart information of the electronic business license, wherein the counterpart information is to-be-verified information.

Step S120: decoding, by a dot matrix decoding module 13, information in a dot matrix 100 in the combined two-dimensional code to obtain a private key.

Step S130: inputting, by a public key storing module 14, a pre-stored public key alk3p3bv84231j6g assigned by an industrial and commercial administration authority.

Step S140: computing, by an abstract computing module 15, an abstract using an MD5 algorithm based on the to-be-verified counterpart information of the electronic business license, the public key, and the private key.

Step S150: comparing, by a correctness verifying module 16, the computed abstract information with the abstract information obtained by decoding the two-dimensional code 30;

Step S160: determining, by the correctness verifying module 16, whether the two pieces of abstract information are consistent; in the case of consistency, proceeding to step S170; and in the case of inconsistency, proceeding to step S180.

Step S170: displaying, by a displaying module 17, the counterpart information of the electronic business license, to be authentic and to pass the verification based on a verification result.

Step S180: displaying, by a displaying module 17, the counterpart information of the electronic business license, to be falsified and not to pass the verification based on a verification result.

As such, a user may determine whether the counterpart information of the electronic business license is authentic based on the displayed result. Because as long as the information has been falsified, even the private key and the public key are not changed, the abstract information changes yet, which thereby guarantees the authenticity of counterpart information of the electronic business license.

For example, if the last full stop in the scope of business in the original content is deleted from the counterpart information of the electronic business license, such a minute change can hardly be identified through comparison with the information in the server. Upon computing the abstract using the MD5 algorithm, the public key used in the computation is still: alk3p3bv84231j6g;

the private key is still: mfuw4aly6j;

even the above keys used in computation are intact, the abstract computed after content change becomes: JM4ugRvDzEaauPeRQwwTqA==, which is different from the original abstract information Y9m7cDBwcv7KLCoy45i+nA==. Consequently, as long as the content changes, the computed abstract changes; therefore, any change can be detected, which effectively guarantees the authenticity of the two-dimensional code as electronic business license.

What have been illustrated above are the combined two-dimensional code reading apparatus and method according to the present disclosure. It may be seen that by adding a public key storing mechanism, an abstract computing mechanism, and a comparing mechanism, a conventional two-dimensional code reading apparatus may serve as a dedicated reading apparatus, which enables determination of authenticity of the counterpart information of the electronic business license without a need of network access or a server.

As the counterpart information of the electronic business license is plaintext, any conventional image inputting device or photoelectric scanning device may automatically recognize it. The combined two-dimensional code may be directly used in place of conventional two-dimensional codes, which lowers use threshold and cost.

What have been described above are only preferred embodiments of the present disclosure, and any change within the scope of the idea of the present disclosure may be allowed. For example, although illustrations have been made with an electronic business license as an example, the applicable object of the combined two-dimensional code is not limited to the electronic business license, which may also be other kind of electronic identity cards or notes, as long as there is certain requirement on the fidelity of the information.

In the embodiments, the key comprises a public key and a private key. However, the public key is not essential, omission of which does not affect the effect. As an algorithm for computing the abstract, the MD5 algorithm is used in the embodiments. However, any other Hash algorithms may be used to compute the abstract information, e.g., any one of CRC8, CRC16, CRC32, MD2, MD4, MD5, SHA1, SHA256, SHA384, SHA512, RIPEMD, PANAMA, TIGER, ADLER32 may be adopted.

VARIED EXAMPLES

In FIGS. 1-3, the dark-colored modules of the dot matrix 100 are round dots, which are different from the shape of the rectangular modules in the two-dimensional code 30. In a varied example, the modules in the dot matrix 100 are identical to the modules in the two-dimensional code 30 in terms of shape, size, interval, and position; therefore, when the image of the dot matrix 100 is embedded into the two-dimensional code 30, as the modules of the dot matrix 100 visually maintains consistent with the modules of the two-dimensional code 30, an effect of concealing the image of the dot matrix 100 is achieved.

For generating the two-dimensional code 30, a blank portion for embedding the dot matrix 100 may be pre-generated; because no modules are existent in the blank portion, the modules of the two-dimensional code 30 are not blocked when embedding the dot matrix 100 into the blank portion, such that bit error will not occur when reading the two-dimensional code 30; compared with the solution of correcting a bit error caused by the dot matrix 100 using the error correction capability of the two-dimensional code 30, the error correction level of the two-dimensional code 30 may be lowered, and the decoding operation speed may be improved.

In the specific embodiment above, illustration has been made to the combined two-dimensional code as the electronic certificate carrier with the electronic business license as an example. However, applications of the combined two-dimensional code as an electronic certificate carrier are not limited to the electronic business license, which may be applied to any scenario which needs anti-counterfeiting, e.g., an electronic license file, an electronic identity file, an electronic order file, and an electronic account file, etc. In the embodiments, illustration has been made with an example of displaying a result of verifying the two-dimensional code information; however, the result may also be used in a manner of trigger signal.

The two-dimensional code 30 in the combined two-dimensional code is not limited to a QR code, which may be any form of two-dimensional code. In the embodiments and varied examples above, illustration has been made to the combined two-dimensional code with a dot matrix. However, it is optional not to set the dot matrix; instead, the private key is directly coded into the two-dimensional code. Namely, for the structure of FIG. 8, the key storing module 2 and the dot matrix image generating module 7 may be omitted; instead, the key generated by the dynamic key generating module 3 is directly inputted into the two-dimensional coding module 5, available for the two-dimensional code image generating module 6 to generate a two-dimensional code image. Correspondingly, for the combined two-dimensional code reading apparatus of FIG. 12, the dot matrix decoding module 13 and the public key storing module 14 may be omitted.

In view of the above, as long as falling into the technical idea of this utility model, various alternation processing may be performed, which has the same effect in preventing information falsification and authenticity assurance.

What is claimed is:

1. A combined two-dimensional code generating apparatus, comprising: a two-dimensional code information generating module, a key information generating module, an abstract computing module, a two-dimensional code coding module, a two-dimensional code image generating module, and a dot matrix image generating module, wherein:
   the two-dimensional code information generating module is configured for generating data information to be coded into the two-dimensional code;
   the key information generating module is configured for generating a key for computing an abstract;
   the abstract computing module is configured for computing, using a hash algorithm, data information coded into the two-dimensional code and the abstract of the key;
   the two-dimensional code coding module is configured for combining the abstract information and the data information coded into the two-dimensional code into coding data of the two-dimensional code;
   the two-dimensional code image generating module is configured for coding the coding data of the two-dimensional code into the two-dimensional code to generate a two-dimensional code image; and
   the dot matrix image generating module is configured for generating a corresponding dot matrix based on the key information, wherein the dot matrix is positioned by a positioning image of the two-dimensional code; the dot matrix is generated outside of an image of the two-dimensional code, or at least part of the dot matrix is generated within the image of the two-dimensional code to supersede an overlapping portion of the image of the two-dimensional code; and the dot matrix entering inside the image of the two-dimensional code is set such that a sum of a bit error rate caused by the dot matrix and a bit error rate of the two-dimensional code per se is smaller than an error correction rate of the two-dimensional code.

2. The combined two-dimensional code generating apparatus according to claim 1, wherein:
   the dot matrix image generating module performs redundancy processing to the key information when generating the dot matrix, such that the dot matrix has an error correction function, wherein an error correction capacity of the dot matrix is identical to or different from an error correction capacity of the two-dimensional code; and
   the dot matrix image generating module performs encryption processing to the key information.

3. The combined two-dimensional code generating apparatus according to claim 2, further comprising:
   a key storing module configured for generating a fixed key, wherein the fixed key serves as a public key, and the key generated by the key information generating module serves as a private key; the public key and the private key are combined into the key, available for the abstract computing module to compute the abstract, and the private key is available for the dot matrix image generating module to generate the dot matrix.

4. The combined two-dimensional code generating apparatus according to claim 3, wherein: the key information generating module generates the key randomly, and whist generating the dot matrix, the dot matrix image generating module generates a dot matrix positioning image for position detection.

5. The combined two-dimensional code generating apparatus according to claim 1, wherein: the algorithm adopted by the abstract computing module for computing the abstract refers to any one of CRC8, CRC16, CRC32, MD2, MD4, MD5, SHA1, SHA256, SHA384, SHA512, RIPEMD, PANAMA, TIGER, and ADLER32.

6. A combined two-dimensional code generating apparatus, comprising: a two-dimensional code information generating module, a key information generating module, an abstract computing module, a two-dimensional code coding module, and a two-dimensional code image generating module, wherein:
   the two-dimensional code information generating module is configured for generating data information to be coded into the two-dimensional code;
   the key information generating module is configured for generating a key for computing an abstract;
   the abstract computing module is configured for computing, using a hash algorithm, the data information coded into the two-dimensional code and the abstract of the key;
   the two-dimensional code coding module is configured for combining the abstract information, the key information, and the data information coded into the two-dimensional code into coding data of the two-dimensional code; and
   the two-dimensional code image generating module is configured for coding the coding data of the two-dimensional code into the two-dimensional code to generate a two-dimensional code image.

7. A combined two-dimensional code generating method, comprising the steps of:
   Step S1: generating data information to be coded into a two-dimensional code;
   Step S2: generating a key for computing an abstract;
   Step S4: computing, using a hash algorithm, the data information coded into the two-dimensional code and the abstract of the key;
   Step S5: combining the abstract information and the data information coded into the two-dimensional code into coding data of the two-dimensional code;
   Step S6: coding the coding data of the two-dimensional code into the two-dimensional code to generate a two-dimensional code image;
   Step S7: determining a setting region of a dot matrix based on a positioning image of the two-dimensional code, wherein the setting region is disposed outside of a two-dimensional code image or is at least partially disposed within the two-dimensional code image to supersede an overlapping portion of the two-dimensional code image, wherein the dot matrix entering inside the two-dimensional code image is set such that a sum of a bit error rate caused by the dot matrix and a bit error rate of the two-dimensional code per se is smaller than an error correction rate of the two-dimensional code; and
   Step S8: generating, based on the key, the dot matrix corresponding to the key in the setting region.

8. The combined two-dimensional code generating method according to claim 7, wherein:
   in the Step S8, upon generation of the dot matrix, redundancy processing is performed to the key information to impart an error correction function to the dot matrix, wherein an error correction capacity of the dot matrix is identical to or different from an error correction capacity of the two-dimensional code; and the key information is subjected to encryption processing.

9. The combined two-dimensional code generating method according to claim 8, further comprising:

Step S3: generating a fixed key, wherein the fixed key serves as a public key, and the key generated in the Step S2 serves as a private key; the public key and the private key are combined into the key available for computing the abstract in the Step S4, and the private key is available for generating the dot matrix in the Step S8.

10. The combined two-dimensional code generating method according to claim 9, wherein in the Step 3, the key is randomly generated.

11. The combined two-dimensional code generating method according to claim 10, wherein a dot matrix positioning image for position detection is generated whilst the dot matrix is generated.

12. The combined two-dimensional code generating method according claim 7, wherein in the Step S4, the abstract is computed using any one of CRC8, CRC16, CRC32, MD2, MD4, MD5, SHA1, SHA256, SHA384, SHA512, RIPEMD, PANAMA, TIGER, and ADLER32.

13. A combined two-dimensional code reading apparatus for reading data information in a combined two-dimensional code, the combined two-dimensional code comprising a two-dimensional code and a dot matrix, the data information and abstract information being coded into the two-dimensional code, key information being coded into the dot matrix, the abstract information being computed based on the data information and the key information using a hash algorithm, the combined two-dimensional code reading apparatus comprising:
  an image acquiring module, a two-dimensional code decoding module, a dot matrix decoding module, an abstract computing module, a correctness verifying module, and a displaying module, wherein:
  the image acquiring module is configured for acquiring an image of the combined two-dimensional code;
  the two-dimensional code decoding module is configured for decoding the two-dimensional code in the combined two-dimensional code to obtain the data information and the abstract information;
  the dot matrix decoding module is configured for decoding the dot matrix in the combined two-dimensional code to obtain the key information;
  the abstract computing module is configured for computing, using a same method as computing an abstract in the combined two-dimensional code, an abstract of synthesized information which results from synthesizing the data information obtained from decoding the two-dimensional code and the key information;
  the correctness verifying module is configured for comparing the computed abstract information with the abstract information obtained from decoding the two-dimensional code to determine a consistency therebetween; and
  the displaying module is configured for displaying or performing a corresponding operation on a pass or a failure of verifying the data information based on a verification result of the correctness verifying module.

14. The combined two-dimensional code reading apparatus according to claim 13, wherein the abstract in the combined two-dimensional code is computed by a key including a public key and a private key, and the private key information is coded into the dot matrix,
  the combined two-dimensional code reading apparatus further comprises a public key storing module; and
  the abstract computing module computes, using a same method as computing an abstract in the combined two-dimensional code, an abstract of synthesized information which results from synthesizing the data information obtained from decoding the two-dimensional code, the public key in the public key storing module, and the key obtained from decoding the dot matrix.

15. A combined two-dimensional code reading method for reading data information in a combined two-dimensional code, the combined two-dimensional code comprising a two-dimensional code and a dot matrix, data information and abstract information being coded into the two-dimensional code, key information being coded into the dot matrix, the abstract information being computed using a hash algorithm based on the data information and the key information, the combined two-dimensional code reading method comprising:
  Step S100: obtaining an image of a combined two-dimensional code;
  Step S110: decoding a two-dimensional code in the combined two-dimensional code to obtain the data information and the abstract information;
  Step S120: decoding the dot matrix in the combined two-dimensional code to obtain the key information;
  Step S140: computing, using a same method as computing an abstract in the combined two-dimensional code, an abstract of synthesized information which results from synthesizing the data information obtained from decoding the two-dimensional code and the key information;
  Step S150: comparing the computed abstract information with the abstract information obtained from decoding the two-dimensional code;
  Step S160: determining whether the two pieces of abstract information are consistent;
  Step S170: in the case of consistency, displaying or performing a corresponding operation on a pass of verification of the data information; and
  Step S180: in the case of inconsistency, displaying or performing a corresponding operation on a failure of verification of the data information.

16. The combined two-dimensional code reading method according to claim 15, wherein a key in the combined two-dimensional code includes a public key and a private key, the private key information is coded into the dot matrix, and the combined two-dimensional code reading method further comprises Step S130, wherein:
  in Step S120: the dot matrix in the combined two-dimensional code is decoded to obtain private key information;
  in Step S130: the stored public key information is inputted;
  in Step S140: an abstract of synthesized information which results from synthesizing the data information obtained from decoding the two-dimensional code and the key information is computed using a same method as computing an abstract in the combined two-dimensional code.

17. A combined two-dimensional code, comprising: a two-dimensional code and a dot matrix, wherein at least part of the dot matrix is disposed at a position inside the two-dimensional code where a positioning image is not blocked; the dot matrix is positioned by the positioning image of the two-dimensional code and associated with the two-dimensional code in terms of image; a size of a setting region of the dot matrix is associated with an error correction level and an area of the two-dimensional code, such that a sum of a bit error rate caused by the dot matrix and a bit error rate of the two-dimensional code per se is smaller than an error correction rate of the two-dimensional code; data information and abstract information are coded in the two-dimensional code; and key information for computing an abstract is coded into the dot matrix, the abstract information being computed using a hash algorithm based on the key information and the data information;

or the dot matrix is disposed outside of an image of the two-dimensional code, the dot matrix being positioned by a positioning image of the two-dimensional code and associated with the two-dimensional code in terms of image; and data information and abstract information are coded in the two-dimensional code, key information for computing an abstract being coded into the dot matrix, the abstract information being computed using a hash algorithm based on the key information and the data information.

18. The combined two-dimensional code according to claim 17, wherein the dot matrix is disposed within the two-dimensional code or at least one side edge of the two-dimensional code in a form of one or more dot matrix.

19. The combined two-dimensional code according to claim 17, wherein dark-colored dots in the dot matrix comprise round dots or characters and an image, and a certain interval is maintained between neighboring dark-colored dots so as to enhance image processing efficiency and visual effect.

20. The combined two-dimensional code according to claim 17, wherein modules in the dot matrix are identical to modules in the two-dimensional code in terms of shape, size, internal and position, such that when the dot matrix is embedded into the two-dimensional code, the visual effect is maintained consistent with surrounding modules of the two-dimensional code.

* * * * *